United States Patent [19]

Visser et al.

[11] 3,896,096
[45] July 22, 1975

[54] MOLECULAR WEIGHT REGULATION OF ETHYLENE ALPHA-OLEFIN COPOLYMERS

[75] Inventors: Harry D. Visser, Cheshire; Walter Nudenberg, Newton, both of Conn.

[73] Assignee: Uniroyal, Inc., New York, N.Y.

[22] Filed: Mar. 25, 1974

[21] Appl. No.: 454,993

[52] U.S. Cl........... 260/80.78; 260/80 M; 260/88.2; 260/94.9 CA; 260/94.9 CB; 260/94.9 CC
[51] Int. Cl. ...... C08f 1/56; C08f 1/80; C08f 15/04; C08f 15/40
[58] Field of Search........................ 260/80.78, 88.2

[56] References Cited
UNITED STATES PATENTS

| | | | |
|---|---|---|---|
| 3,462,399 | 8/1969 | Matthews........................ | 260/80.78 |
| 3,513,047 | 5/1970 | Campbell et al...................... | 156/96 |
| 3,819,592 | 6/1974 | Visser et al..................... | 260/80.78 |

OTHER PUBLICATIONS
Chem. Abstracts, 1967, Vol. 66, 2985k.

*Primary Examiner*—Joseph L. Schofer
*Assistant Examiner*—A. L. Clingman
*Attorney, Agent, or Firm*—James J. Long

[57] ABSTRACT

In the copolymerization of alpha-olefins, especially the copolymerization of ethylene and propylene (with a diene if desired), using a coordination type catalyst based on a vanadium salt and an alkylaluminum halide, the molecular weight of the polymer can be regulated, and the activity of the catalyst can be enhanced, by adding disulfides of the type:

a)

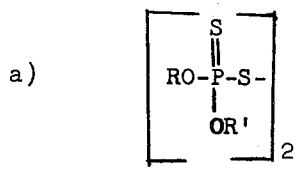

b)

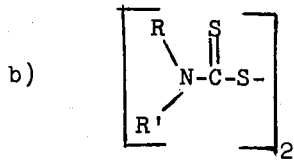

c)

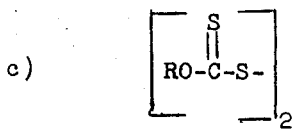

where R and R' are alkyl (e.g., ethyl) or the like.

27 Claims, No Drawings

MOLECULAR WEIGHT REGULATION OF ETHYLENE ALPHA-OLEFIN COPOLYMERS

Our copending application Ser. No. 391,902, filed Aug. 27, 1973, now U.S. Pat. No. 3,819,952, issued June 25, 1974, discloses the use of certain dithiocarbamates, phosphorodithioates or dithiocarbonates as regulators for the copolymerization of alpha-olefins.

This invention relates to a method of copolymerizing alpha-olefins.

Certain organic and inorganic sulfur compounds have been demonstrated to possess molecular weight regulating ability; in fact, sulfur itself is an excellent activator/regulator (U.S. Pat. No. 3,377,325, Uniroyal, F. C. Loveless, Apr. 9, 1968). Alkyl disulfides are also regulators (U.S. Pat. No. 3,462,399, Uniroyal, D. M. Matthews, Aug. 19, 1969). Compounds like $SO_2Cl$ have also been shown to possess activator/regulator properties (U.S. Pat. No., Contential Oil, 3,380,930, D. B. Miller, Apr. 30, 1968).

According to the present invention, it has been found that certain sulfur vulcanization accelerators are capable of regulating the copolymerization of ethylene and another alpha-olefin, with or without a copolymerizable polyene, by the conventional soluble catalyst system based on an alkylaluminum halide and a vanadium salt. More particularly, the invention is based on the discovery that certain disulfides are effective regulators of the copolymerization.

Synthetic, rubbery ethylene-alpha-olefin copolymers are important and valuable materials, especially the unsaturated, sulfur-vulcanizable forms of such copolymers containing copolymerized therein a nonconjugated diene in addition to the ethylene and alpha-olefin. The invention is concerned with an improvement in a highly preferred method of making such copolymers, using a soluble catalyst based on an alkylaluminum halide and a vanadium salt.

While such a catalyst system has many advantages, nevertheless it has been desirable to improve still further the polymerization method. In particular, it has been desirable to provide a way of regulating the molecular weight of the polymer, so that a material of lower molecular weight and easy processability can be obtained. In anionic coordination polymerization, the molecular weight of the polymer produced is usually high, frequently too high even for conventional applications as a rubber (e.g. too high molecular weight for good mill processability). The molecular weight can usually be varied to some degree by changing polymerization parameters, such as catalyst and cocatalyst type, catalyst concentration, concentration of monomers and polymerization temperature. The magnitude of the molecular weight reduction obtained from these changes is usually rather small, and in addition the yield and quality of the product is often adversely affected. Another way of reducing the molecular weight involves the use of a so-called molecular weight regulator which when added to the polymerization, reduces the molecular weight, hopefully without having any adverse effect on the quality or quantity of the polymer product.

It is to be emphasized that the catalyst system employed in the invention is of the soluble kind (i.e., soluble in the monomers and/or in the usual solvents used as polymerization media, e.g. hexane), as distinguished from insoluble or heterogeneous catalyst systems. The alkylaluminum halide that forms the catalyst system along with the vanadium salt may be a dialkylaluminum halide, a monoalkylaluminum dihalide or a alkylaluminum sesquihalide, where the alkyl group can have from 1 to 10 carbon atoms, such as a methyl, ethyl, propyl, etc. The halogen in these alkylaluminum compounds is usually chlorine although bromine or other halogen may be used. Among the vanadium salts which may be used are vanadium halides, oxyhalides, alkoxides, and acetylacetonates. Specific examples of these compounds are vanadium trichloride, vanadium tetrachloride, or bromide, vanadium oxydichloride, vanadium oxytrichloride, trialkyl vanadates (especially where the alkyl group contains 1-12 carbon atoms, e.g. tri-n-butyl vanadate), vanadyl or vanadium acetylacetonate, and the like, as well as compounds based on mixtures of more than one of the foregoing types, such as dialkyl halovandates (e.g. dibutyl chlorovandate) and alkyl dihalovanadates (e.g. butyl dichlorovanadate). In many cases the preferred vanadium salts are vanadium oxytrichloride, vanadyl or vanadium acetylacetonates, lower trialkyl vanadates (where the alkyl groups contains 1-4 carbon atoms) and halovandates, especially chlorovanadates (mono and dichloro). As in conventional practice, the molar ratio of aluminum to vanadium is ordinarily at least 4:1 and usually about 10:1; higher ratios such as 20:1, 35:1, 50:1, or even higher, may be used. If desired, very high ratios of aluminum to vanadium (e.g. 200:1 or higher) may be employed, especially in those cases where the concentration of the vanadium salt is very small. Conventional catalysts of this kind are described in U.S. Pat. No. 3,547,855, Loveless, Dec. 15, 1970.

The sulfur vulcanization accelerators which can be used as regulators in the present invention may be:

a. A bis(thionophosphonato) disulfide of the following formula:

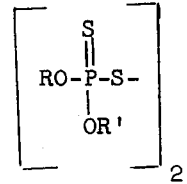

b. A thiuram disulfide of the formula:

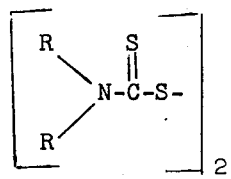

c. A xanthogen disulfide of the formula:

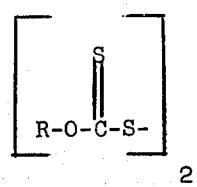

where R and R' in the stated formula can be the same of different and can be, for example, a hydrocarbon group, ordinarily a hydrocarbon group devoid of ethylenic and acetylenic unsaturation having from 1 to 18 carbon atoms, such as, for example an alkyl group (such as methyl, ethyl, butyl, hexyl, octyl, dodecyl, or octadecyl), a cycloalkyl group (such as cyclopentyl, cyclohexyl or cyclooctyl), an aryl group (such as phenyl, tolyl, xylyl, nonylphenyl, naphthyl), an aralkyl group (such as benzyl, phenylethyl, phenylbutyl or naphthylethyl), or the like. The R and R' need not be separate distinct organic groups but can also constitute a diradical, such as a chain of 3 to 8 methylene groups as in trimethylene, 2,2-dimethyltrimethylene, tetramethylene, or pentamethylene.

The preferred type regulators are the compounds where the R and R' are alkyl groups with 2–6 carbon atoms.

Depending upon the exact structure of the regulator and the degree of molecular weight regulation desired, these regulators are frequently used at a level of 0.05 to 5 times of the vanadium catalyst (on a molar basis). The preferred level usually lies between 0.5 to 1.5 times the molar concentration of the vanadium catalyst species.

The present invention is applicable to the production of interpolymers of ethylene and propylene, 1-butene, 1-octene, etc, as well as in the production of unsaturated, sulfur-vulcanizable, rubbery terpolymers of ethylene, an alpha-olefin and a copolymerizable polyene, especially a diene, particularly a non-conjugated diene such as dicyclopentadiene, bicyclononadiene, 1,4-hexadiene, 5-methylene-2-norbornene, 5-ethylidene-2-norbornene, 5-propylidene-2-norbornene, etc. Preferred terpolymers contain from about 1 to about 25% (more preferably about 2 to about 25%) by weight of a non-conjugated diene such as dicyclopentadiene or the like; the remaining portion of the terpolymer contains propylene (or other alpha-olefin) and ethylene in the weight ratio in the range from about 15/85 to about 85/15. Ethylene-propylene copolymers have the same weight-ratio of propylene and ethylene.

The polymerization is conveniently carried out in a solvent, although an added solvent is not essential; the monomers being polymerized can serve as the solvent. In general, the normal solvents for coordination anionic polymerization can be used. These include the aromatic hydrocarbons (e.g. benzene, toluene, or xylene), aliphatic hydrocarbons (e.g. hexane or heptane), chlorobenzene, tetrachloroethylene, and any other inert solvent which will not destroy the catalyst. The temperature is not critical and may be as in conventional practice, e.g., from 0° to 100°C.

The procedure may otherwise be the same as in conventional practice as far as such details as type of polymerization equipment, pressure, concentration of catalyst, and the like, are concerned and may be carried out batchwise or continuously (see for example U.S. Pat. No. 3,341,503, Paige et al., Sept. 12, 1967). Incremental addition of ingredients may be employed. In a continuous polymerization the organoaluminum compound, the regulator and the vanadium compound may be added as separate feeds to the monomer solution. In a batch polymerization a preferred procedure involves combining the organoaluminum compound and the regulator in the presence of at least a portion of the monomers and then adding the vanadium compound.

The following examples will serve to illustrate the practice of the invention in more detail.

EXAMPLE 1

This example illustrates the use of:

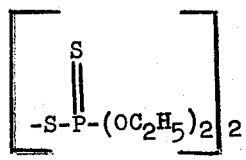

as a catalyst activator. The technique of mixing the primary catalyst components (i.e. the EASC and VOCl$_3$) in the absence of the polymerizing monomers was used to accentuate the difference between the relatively poor yield obtained in the absence of the activator with that of the significantly higher yield obtained with the use of the activator.

The reactor employed was a dry one-gallon glass autoclave equipped with a pressure gauge, thermometer, gas inlet tube, stirrer, rubber gasket for liquid injection, and an internal cooling coil attached to an external cooling source. Into this reactor was introduced 2700 ml of dry n-hexane and 5 ml of 5-ethylidene-2-norbornene (abbreviated as ENB). Propylene gas was fed into the reactor to an internal pressure of 30 psig at a temperature of 30°C. The pressure was then brought to 50 psig by feeding ethylene.

Then 3.0 mmoles of

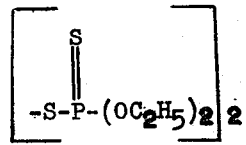

was added. Next 78 ml of a premix catalyst solution containing 3.0 mmoles of VOCl$_3$ and 15 mmoles of ethylaluminum sesquichloride (abbreviated as EASC) which had been aged for 2.5 hours. An additional 2 ml increment of ENB was added to the reactor 5 minutes after the vanadium oxytrichloride addition. The reaction was allowed to proceed for 30 minutes while maintaining the temperature at 30°C and maintaining the pressure at 50 psig by feeding ethylene and propylene at a 1/1 molar ratio. After 30 minutes the polymerization was terminated by the addition of 3 ml of polypropylene glycol (molecular weight about 400). The terpolymer was precipitated by adding the reaction mixture to 3000 ml of isopropanol containing 0.4% weight of 2,2'-methylene-bis(4-methyl-6-t-butylphenol) antioxidant. The polymer was dried overnight under vacuum at 40°C. The yield was 125.5 grams of polymer containing 45% propylene by weight; iodine number 9.1; intrinsic viscosity 1.52 (all intrinsic viscosities herein are expressed as deciliters per gram in tetralin at 135°C.)

Repetition of this example without the

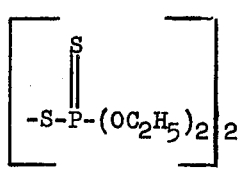

activator addition gave only 42.8 grams of terpolymer containing 39% propylene by weight; iodine number 13.4; intrinsic viscosity 3.32 deciliters per gram in tetralin at 135°C. This data is listed in Table I, along with other examples where the A column represents the control without

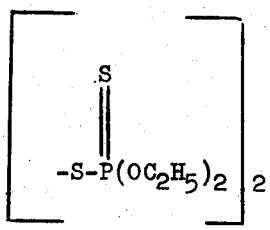

(designated activator Al in Table I) and the B column represents the practice of the invention.

EXAMPLES 2-5

Examples 2-5 demonstrate the use of:

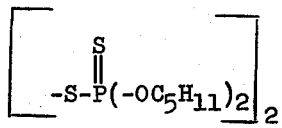

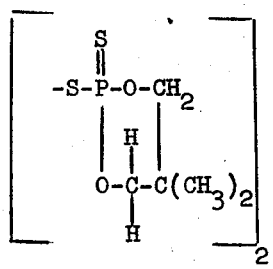

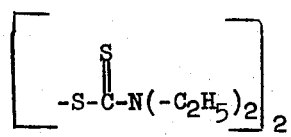

and 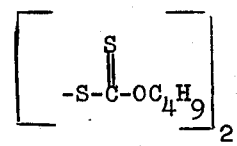

as activators (designated activator A2, A3, A4 and A5, respectively, in Table I) in preparation of ethylene-propylene-5-ethylidene-2-norbornene (abbreviated as ENB) terpolymers. The catalyst and cocatalyst concentrations were the same as in Example 1. The experimental procedure was substantially the same as in Example 1. The results are shown in Table I.

EXAMPLES 6-9

Examples 6-9 demonstrate the use of

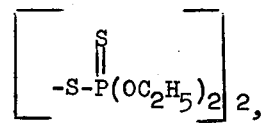

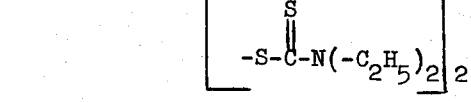

and 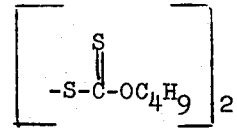

as regulators (designated Regulator A1, A4 and A5, respectively, in Table II) for fresh (i.e. unaged) catalyst in preparation of ethylene-propylene-ENB terpolymers. The reactor system used in these examples was the same as that described in Example 1, but the following changes in the polymerization procedure were employed. Into the reactor was introduced 2700 ml of dry n-hexane, 15 mmoles of EASC as a 25% by weight solution of n-hexane and 10 ml of ENB. Propylene gas was fed into the reactor to an internal pressure of 30 psig at a temperature of 30°C. The pressure was then brought to 50 psig (30°) by feeding ethylene. An 80 ml n-hexane solution containing 3.0 mmoles of the molecular weight regulator was loaded into a pressure pipet. This solution was added to the reactor over a 20 minute time span. Simultaneous with the beginning of the regulator addition, 2.0 mmoles of $VOCl_3$ was added to the loaded reactor. An additional 5 ml portion of ENB was added 5 minutes after the $VOCl_3$ injection. The polymerization was shortstopped at 30 minutes with 2.0 ml of polypropylene glycol. The remainder of the work-up procedure was the same as in Example 1.

The Examples 6, 7 and 8 (see Table II) show three different disulfide molecular weight regulators. Example 9 is a similar polymerization except that no regulator was added. The intrinsic viscosities of Examples 6, 7 and 8, all of which contain a regulator, are significantly lower than Example 9.

TABLE I

| Activation of EP Copolymerization Catalysts | | | | | | |
|---|---|---|---|---|---|---|
| Example: | 1 | | 2 | 3 | 4 | 5 |
| | A | B | | | | |
| Cocatalyst (mmoles) EASC | 15 | 15 | 15 | 15 | 15 | 15 |
| Catalyst (mmoles) $VOCl_3$ | 3 | 3 | 3 | 3 | 3 | 3 |
| Catalyst Aging Time (hrs.) | 2.5 | 2.5 | 2.5 | 2.6 | 2.8 | 2.5 |
| Diene | ENB | ENB | ENB | ENB | ENB | ENB |
| Activator (mmoles) | | | | | | |
| A1 | — | 3.0 | — | — | — | — |
| A2 | — | — | 3.0 | — | — | — |

TABLE I—Continued

Activation of EP Copolymerization Catalysts

| Example: | 1 | 2 | 3 | 4 | 5 |
|---|---|---|---|---|---|
| A3 | — | — | — | 3.0 | — | — |
| A4 | — | — | — | — | 3.0 | — |
| A5 | — | — | — | — | — | 3.0 |
| Yield, g. | 42.8 | 125.5 | 126.0 | 121.5 | 55.8 | 72.4 |
| Iodine Number | 13.4 | 9.1 | 8.5 | 8.8 | 10.2 | 10.5 |
| Propylene, wt. % | 39 | 45 | 44 | 46 | 41 | 45 |
| Intrinsic Viscosity (135°C) | 3.32 | 1.52 | 1.74 | 1.85 | 2.36 | 1.53 |

TABLE II

Regulation of EP Copolymerization

| Example: | 6 | 7 | 8 | 9 |
|---|---|---|---|---|
| Cocatalyst (mmoles) | | | | |
| EASC | 15 | 15 | 15 | 15 |
| Catalyst (mmoles) | | | | |
| VOCl$_3$ | 2 | 2 | 2 | 2 |
| Diene | ENB | ENB | ENB | ENB |
| Regulator | A1 | A4 | A5 | — |
| Regulator (mmoles) | 3.0 | 3.0 | 3.0 | — |
| Yield, g. | 176.6 | 164.4 | 116.5 | 148.6 |
| Iodine Number | 14.0 | 14.7 | 19.0 | 17.0 |
| Propylene, wt. % | 48 | 42 | 48 | 47 |
| Intrinsic Viscosity (135°C) | 1.65 | 2.23 | 1.17 | 2.97 |

We claim:

1. In a method of copolymerizing ethylene and an alpha-monoolefin, with or without a copolymerizable non-conjugated diene, in solution in an inert organic solvent in the presence of a vanadium salt-alkylaluminum halide anionic coordination polymerization catalyst which is soluble in said solvent, the improvement comprising carrying out the said polymerization in the presence of a regulator-activator selected from the group consisting of a. a bis(thionophosphonato) disulfide of the formula:

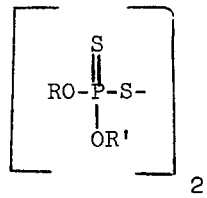

b. a thiuram disulfide of the formula

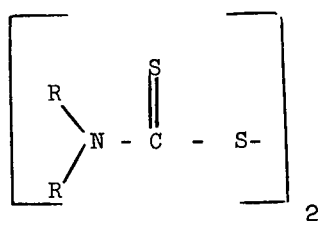

and c. a xanthogen disulfide of the formula:

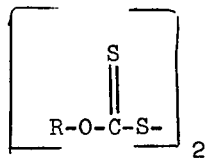

where the R's are the same or different and are hydrocarbon groups containing 1 to 18 carbon atoms devoid of olefinic and acetylenic unsaturation selected from alkyl, cycloalkyl, aryl and aralkyl groups, whereby the molecular weight of the resulting copolymer is regulated and/or the catalyst is activated.

2. A method as in claim 1 in which the said copolymer is an ethylene-propylene-non-conjugated diene terpolymer.

3. A method as in claim 2 in which the said diene is 5-ethylidene-2-norbornene.

4. A method as in claim 1 in which the said vanadium salt is vanadium oxytrichloride.

5. A method as in claim 1 in which the said alkylaluminum halide is ethylaluminum sesquihalide.

6. A method as in claim 1 in which the said regulator-activator has the said formula (a).

7. A method as in claim 6 in which R and R' together form a 2,2-dimethyltrimethylene group.

8. A method as in claim 6 in which R and R' are alkyl groups having 2–6 carbon atoms.

9. A method as in claim 8 in which R and R' are ethyl groups.

10. A method as in claim 8 in which R and R' are amyl groups.

11. A method as in claim 1 in which the said regulator-activator has the said formula (b).

12. A method as in claim 11 in which R and R' are alkyl groups having 2–6 carbon atoms.

13. A method as in claim 12 in which R and R' are ethyl groups.

14. A method as in claim 1 in which the said regulator-activator has the said formula (c).

15. A method as in claim 14 in which R is an alkyl group having 2–6 carbon atoms.

16. A method as in claim 15 in which R is butyl.

17. A method as in claim 1 in which the said alpha-monoolefin is propylene.

18. A method as in claim 17 in which a copolymerizable non-conjugated diene is also present.

19. A method as in claim 18 in which the said regulator-activator has the formula (a) and R and R' are alkyl groups having 2–6 carbon atoms.

20. A method as in claim 19 in which the vanadium salt is vanadium oxytrichloride and the alkylaluminum halide is ethylaluminum sesquichloride.

21. A method as in claim 20 in which the said diene is 5-ethylidene-2-norbornene.

22. A method as in claim 18 in which the said regulator-activator has the formula (b) and R and R' are alkyl groups having 2–6 carbon atoms.

23. A method as in claim 22 in which the vanadium salt is vanadium oxytrichloride and the alkylaluminum halide is ethylaluminum sesquihalide.

24. A method as in claim 23 in which the said diene is 5-ethylidene-2-norbornene.

25. A method as in claim 18 in which the said regulator-activator has the formula (c) and R is an alkyl group having 2–6 carbon atoms.

26. A method as in claim 25 in which the vanadium salt is vanadium oxytrichloride and the alkylaluminum halide is ethylaluminum sesquihalide.

27. A method as in claim 26 in which the said diene is 5-ethylidene-2-norbornene.

* * * * *